June 15, 1943.  L. G. HOWLETT  2,321,749
CULINARY UTENSIL
Filed Jan. 25, 1943

INVENTOR.
Lewis G. Howlett
BY Earl D Chappell
ATTORNEYS.

Patented June 15, 1943

2,321,749

UNITED STATES PATENT OFFICE 2,321,749

CULINARY UTENSIL

Lewis G. Howlett, Hartford, Mich., assignor to Burnette Castings Company, Hartford, Mich.

Application January 25, 1943, Serial No. 473,485

3 Claims. (Cl. 53—1)

This invention relates to improvements in culinary utensils.

The main objects of this invention are:

First, to provide a closed culinary utensil or vessel having an improved water or vapor seal.

Second, to provide a molded cooking utensil of the type described provided during the molding operation with means for production of an annular vapor seal which is very effective to prevent the escape of vapors from the utensil during the cooking operation.

Third, to provide a molded cooking utensil including top and bottom vessel members having coacting reinforced annular surfaces of relatively larger vapor condensing capacity effective to provide a very practical, quickly produced and satisfactory vapor or water seal.

Objects relating to details and economies of the invention will appear from the description to follow. The invention is defined in the claims.

A preferred embodiment of the invention is illustrated in the accompanying drawing, wherein.

Figure 1:
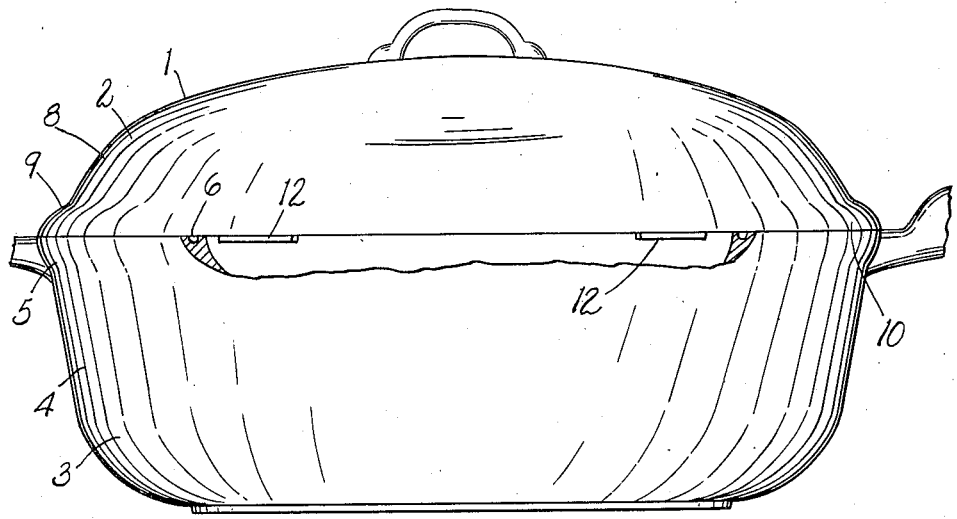
Fig. 1 is a fragmentary view in side elevation partially broken away and in section to illustrate the coacting top and bottom members of the utensil of the invention, showing in part the vapor seal provisions thereof.

It is the purpose of the present invention to provide a water sealed cooking utensil including a pair of coacting top and bottom vessel members fabricated entirely by molding, the said members having coacting annular surfaces formed in the molding operation, which are characterized by the large vapor condensing capacity thereof, so as to provide a very effective vapor or water seal by condensation of steam evolved in the cooking process. These members are simple and inexpensive of production and extremely strong and rugged by reason of the enlargement of the aforesaid surfaces for the purpose noted.

Referring to the drawing, the reference numeral 1 in general indicates the closed vessel or utensil of the invention which comprises the coacting molded or cast top and bottom members 2, 3 respectively.

Figure 2:
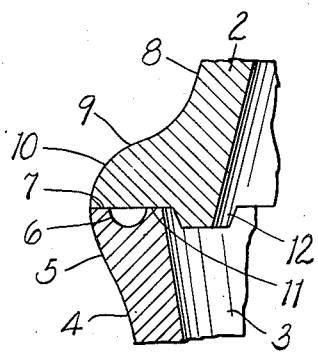
Fig 2 is an enlarged fragmentary view in vertical section more clearly illustrating the features whereby the vapor or water seal is produced.

Referring to Fig. 2, the bottom member 3 includes an annular side wall 4, the outer surface of which is flared out substantially at 5 in a continuous curve merging with the side wall to provide sufficient thickness at the top of the wall to reinforce the wall and accommodate the annular groove 6 in the enlarged flat top surface 7 of the latter. This groove is preferably semi-circular in section, the edges terminating flush with the top surface 7.

The top vessel member 2 has an annular wall 8 merging with the top thereof and flared out sharply at 9 to provide an annular radial extending lip or flange 10 of substantial size or radial thickness. Relatively large amounts of metal are provided in these opposed flange or enlarged portions providing for a quick and effective water seal. The extreme outer circumference of the top and bottom members is the same, so that the peripheries thereof coincide in operative position of the vessel members.

The annular lip 10 has a flat bottom surface 11 coacting with the flat top surface 7 of the bottom vessel member 3 and suitable lugs 12 are provided projecting downwardly from surface 11 for engagement with the inner side of wall member 4 to prevent displacement of the top and bottom vessel members in use. It should be noted that there is no continuous annular tongue on either of the members telescoping with the other or any other provision in any way effective to prevent the initial rise and seepage of steam or vapors from the interior of the vessel into and through the greater part of the joint between the top and bottom vessel members.

It should be noted in particular that the sharp outward flaring at 9 of the top vessel member wall 8 and the resultant substantial dimensions of the annular lip 10 insure the provision of an annular mass of metal which is substantially remote from the hot interior of the vessel, yet adjacent the joint between members 2, 3. This mass is at a relatively cool temperature when the cooking has proceeded for some time, compared to the thinner walls of the vessel members.

The vessel shown and described is a frying or stewing pan. However, it is evident that the provisions of my invention have application generally to closed cooking utensils. In operation, steam or vapor evolved in the cooking process rises in the vessel and, following a predetermined period, traverses the inner portion of the joint between the top and bottom members and enters the groove 6 formed in the lower thereof. There the relatively cool under surface 11 of lip or flange 10 causes the moisture to condense, the heat being quickly dissipated through the flange. Such condensation continues, inasmuch as the large lip 10 has amply sufficient radiating and conductive capacity to condense any vapor admitted to the seal until the groove 6 is completely filled with water and a fully effective water seal results which thereafter effectively prevents any escape of vapors from the vessel.

From a cost standpoint, the foregoing utensil is superior to any water sealed vessel with which I am familiar. The relatively large and massive character of the annular extremities of both the top and bottom vessel members greatly reinforces and strengthens the same. This utensil is economically produced by a molding operation and is devoid of complicated structural features which would make its fabrication by molding impractical or objectionably increase the expense thereof. The reinforcing enlargement of the annular extremities of the members is the feature which contributes most materially to the increased effectiveness of this water seal by enabling the quick initial condensation of vapor entering the seal.

I have illustrated and described the invention in an embodiment which is very practical. I have not attempted to illustrate or describe other embodiments or adaptations, as it is believed this disclosure will enable those skilled in the art to embody or adapt my invention as desired.

Having thus described my invention, what I claim as new and desire to secure by Letters Patent is:

1. A cooking vessel comprising a pair of coacting annular molded metal top and bottom utensil members each of which is flared outwardly to a substantial extent at the open extremity thereof to provide relatively massive annular reinforced joint portions presenting coacting joint surfaces of substantial radial width, said surfaces having flush sealing engagement throughout the periphery of the vessel and the lowermost thereof being provided with an annular groove of semi-circular section extending around the entire periphery of the lower member, said groove being disposed intermediate the inner and outer sides of the lower member surface and coacting with the corresponding or juxtaposed surface of the top member in providing a water seal channel, the outward flaring of said upper member joint portion being relatively sharp to provide a substantial mass of metal above said channel remote from the interior of the vessel and at a relatively low temperature to insure quick conduction and radiation of heat from the channel and thereby facilitate condensation of vapor entering the channel.

2. A cooking vessel comprising a pair of coacting annular metal top and bottom utensil members each of which is flared to a substantial extent at the open extremity thereof to provide relatively massive annular reinforced joint portions presenting coacting joint surfaces of substantial radial width, said surfaces having flush sealing engagement throughout the periphery of the vessel and the lowermost thereof being provided with an annular groove extending around the entire periphery of the lower member, said groove being disposed intermediate the inner and outer sides of the lower member surface and coacting with the corresponding or juxtaposed surface of the top member in providing a water seal channel, said upper member joint portion providing a substantial mass of metal above said channel remote from the interior of the vessel and at a relatively low temperature to insure quick conduction and radiation of heat from the channel and thereby facilitate condensation of vapor entering the channel.

3. A cooking vessel comprising a pair of coacting annular metal top and bottom utensil members each of which is flared to a substantial extent at the open extremity thereof to provide relatively massive annular reinforced joint portions presenting coacting joint surfaces of substantial radial width, said surfaces having flush sealing engagement throughout the periphery of the vessel and the lowermost thereof being provided with an annular groove extending around the entire periphery of the lower member, said groove being disposed intermediate the inner and outer sides of the lower member surface and coacting with the corresponding or juxtaposed surface of the top member in providing a water seal channel, said flared joint portions providing a substantial mass of metal adjacent said channel remote from the interior of the vessel and at a relatively low temperature to insure quick conduction and radiation of heat from the channel and thereby facilitate condensation of vapor entering the channel.

LEWIS G. HOWLETT.